(12) United States Patent
Tanaka

(10) Patent No.: US 12,523,497 B2
(45) Date of Patent: Jan. 13, 2026

(54) MAP UPDATE DEVICE, METHOD, AND COMPUTER PROGRAM FOR UPDATING MAP

(71) Applicant: Woven by Toyota, Inc., Tokyo (JP)

(72) Inventor: Masahiro Tanaka, Tokyo-to (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 223 days.

(21) Appl. No.: 18/366,904

(22) Filed: Aug. 8, 2023

(65) Prior Publication Data

US 2024/0068837 A1 Feb. 29, 2024

(30) Foreign Application Priority Data

Aug. 31, 2022 (JP) ................. 2022-138051

(51) Int. Cl.
*G01C 21/00* (2006.01)
(52) U.S. Cl.
CPC ..... *G01C 21/3859* (2020.08); *G01C 21/3822* (2020.08)
(58) Field of Classification Search
CPC ............ G01C 21/3859; G01C 21/3822; G01C 21/3841; G01C 21/3848; G01C 21/3811
See application file for complete search history.

(56) References Cited

U.S. PATENT DOCUMENTS

| 12,313,428 B2* | 5/2025 | Hayashi | G01S 19/31 |
| 12,326,346 B2* | 6/2025 | Tanaka | G01C 21/3848 |
| 2019/0221121 A1* | 7/2019 | Guo | H04W 4/46 |
| 2020/0110817 A1* | 4/2020 | Viswanathan | G06F 16/215 |
| 2021/0033416 A1* | 2/2021 | Vladimerou | G01C 21/3658 |
| 2021/0190535 A1* | 6/2021 | Tomioka | G05D 1/0246 |
| 2021/0404843 A1* | 12/2021 | Imai | G01C 21/1656 |
| 2022/0067964 A1* | 3/2022 | Kitaura | G06T 7/74 |
| 2022/0404170 A1* | 12/2022 | Tanaka | G01C 21/3822 |
| 2023/0160701 A1* | 5/2023 | Tsukadaira | G08G 1/01 701/450 |

(Continued)

FOREIGN PATENT DOCUMENTS

| JP | 2009-217832 A | 9/2009 |
| JP | 2018205103 A * | 12/2018 |

(Continued)

*Primary Examiner* — Redhwan K Mawari
*Assistant Examiner* — Kai N Wang
(74) *Attorney, Agent, or Firm* — Sughrue Mion, PLLC

(57) ABSTRACT

A map update device includes a processor configured to identify one or more registered features within a predetermined distance of the position of a feature indicated by feature data received from a vehicle among individual registered features represented in map information, associate the feature indicated by the feature data with a registered feature of the same type as the feature indicated by the feature data or of a type belonging to the same group as the type of the feature among the one or more identified registered features, by referring to feature group information indicating two or more similar types among a plurality of types of the features as the same group, and update at least the position or type of a registered feature, based on the positions or types of the features indicated by the feature data associated with the registered feature.

7 Claims, 8 Drawing Sheets

(56) References Cited

U.S. PATENT DOCUMENTS

| | | | | |
|---|---|---|---|---|
| 2023/0266469 A1* | 8/2023 | Xia | ............... | G06T 7/521 |
| | | | | 356/4.01 |
| 2023/0273029 A1* | 8/2023 | Filimonov | ............ | G01C 21/30 |
| | | | | 701/468 |
| 2023/0296401 A1* | 9/2023 | Tanaka | ............... | G01C 21/3859 |
| | | | | 701/450 |

FOREIGN PATENT DOCUMENTS

| | | |
|---|---|---|
| JP | 2021-073547 A | 5/2021 |
| WO | 2013/140567 A1 | 9/2013 |
| WO | 2014/013545 A1 | 1/2014 |

* cited by examiner

ASSOCIATED

UNASSOCIATED

ASSOCIATED WITH ONE HAVING A HIGHER DEGREE OF SIMILARITY

MAP UPDATE DEVICE, METHOD, AND COMPUTER PROGRAM FOR UPDATING MAP

FIELD

The present invention relates to a map update device, a method, and a computer program for updating information on a feature represented in a map.

BACKGROUND

High-precision maps to which an autonomous vehicle-driving system refers for autonomous driving control of a vehicle are required to accurately represent information on features on or around roads which relate to travel of vehicles. In view of this, a technique to update a map in which a change occurs reliably and accurately has been proposed (see Japanese Unexamined Patent Publication JP2021-73547A).

In the technique disclosed in JP2021-73547A, a server device stores an advanced map DB including feature information on features in a storage unit. The server device receives difference information indicating the difference between feature information and an actual feature corresponding to the feature information from vehicle-mounted devices each equipped with an external sensor for measuring features. The server device transmits a raw-data request signal for requesting transmission of raw measurement data of an actual feature to the vehicle-mounted devices, depending on a confidence level calculated on the basis of pieces of difference information.

SUMMARY

Some types of features are similar to other types of features. The type of such a feature may be erroneously recognized at generating data representing the feature on a vehicle side or erroneously recorded in a map before update. In such a case, if a feature indicated by collected data is associated only with a feature of the same type among the features recorded in a map before update, the feature may not be associated with a proper feature in the map. This may result in inaccurate updating of the map or an increase in the amount of data that is not used for updating the map.

It is an object of the present invention to provide a map update device that can update map information appropriately with collected data representing a feature.

According to an embodiment, a map update device is provided. The map update device includes a memory configured to store the positions of individual registered features represented in map information as well as feature group information indicating two or more similar types among a plurality of types of features as the same group; and a processor configured to: identify one or more registered features within a predetermined distance of the position of the feature indicated by feature data received from a vehicle via a communication interface among the individual registered features represented in the map information, associate the feature indicated by the feature data with a registered feature of the same type as the feature indicated by the feature data or of a type belonging to the same group as the type of the feature among the one or more identified registered features, by referring to the feature group information, and update at least the position or type of at least one of the individual registered features represented in the map information, based on the positions or types of the features indicated by a predetermined number of pieces of the feature data associated with the one of the registered features.

The feature group information preferably indicates groups of two or more levels among which the degree of similarity of the types of the features belonging to the same group differs. The processor of the map update device preferably searches for a registered feature of a type belonging to the same group as the type of the feature indicated by the feature data among the one or more identified registered features in order from a group having a higher degree of similarity, and associates the feature indicated by the feature data with the searched registered feature.

The feature group information preferably indicates groups of two or more levels among which the degree of similarity of the types belonging to the same group differs. The processor of the map update device preferably increases weights of the features indicated by the predetermined number of pieces of the feature data associated with at least one of the individual registered features represented in the map information as the degree of similarity of a group of the type of the one of the registered features increases. The weights are used for updating the position or type of the one of the registered features.

For each of two or more types of the features indicated by the feature data, the feature data preferably further includes a confidence score indicating how likely the feature indicated by the feature data is of the type. The processor of the map update device preferably searches, in order from a type having a higher confidence score regarding the feature indicated by the feature data, for a registered feature of a type belonging to the same group as the type, and associates the feature indicated by the feature data with the searched registered feature.

According to another embodiment, a method for updating a map is provided. The method includes identifying one or more registered features within a predetermined distance of the position of a feature indicated by feature data received from a vehicle via a communication interface among individual registered features represented in map information; associating the feature indicated by the feature data with a registered feature of the same type as the feature indicated by the feature data or of a type belonging to the same group as the type of the feature among the one or more identified registered features, by referring to feature group information indicating two or more similar types among a plurality of types of the features as the same group; and updating at least the position or type of at least one of the individual registered features represented in the map information, based on the positions or types of the features indicated by a predetermined number of pieces of the feature data associated with the one of the registered features.

According to still another embodiment, a non-transitory recording medium that stores a computer program for updating a map is provided. The computer program includes instructions causing a computer to execute a process including identifying one or more registered features within a predetermined distance of the position of a feature indicated by feature data received from a vehicle via a communication interface among individual registered features represented in map information; associating the feature indicated by the feature data with a registered feature of the same type as the feature indicated by the feature data or of a type belonging to the same group as the type of the feature among the one or more identified registered features, by referring to feature group information indicating two or more similar types among a plurality of types of the features as the same group; and updating at least the position or type of at least one of the individual registered features represented in the map information, based on the positions or types of the features indicated by a predetermined number of pieces of the feature data associated with the one of the registered features.

The map update device according to the present disclosure has an advantageous effect of being able to update map information appropriately with collected data representing a feature.

DESCRIPTION OF EMBODIMENTS

A map update device, a method for updating a map executed by the map update device, and a computer program for updating a map will now be described with reference to the attached drawings. Regarding a predetermined region, the map update device collects data indicating the position and type of a feature related to travel of a vehicle (hereafter "feature data") from one or more vehicles that can communicate, and updates the position or type of a feature represented in map information, based on the collected feature data. In the following, a feature represented in map information will be referred to as a "registered feature" for convenience of description. The map update device identifies registered features within a predetermined distance of the position of a feature indicated by received feature data among individual registered features represented in map information to be updated. In addition, the map update device associates the feature indicated by the received feature data with a registered feature of the same type as the feature indicated by the received feature data or of a type belonging to the same group as the type of the feature among the identified registered features, by referring to feature group information. For each registered feature represented in the map information, the map update device updates at least the position or type of the registered feature, based on the features indicated by at least a predetermined number of pieces of feature data associated with the registered feature.

Detection target features include various signposts, various road markings, traffic lights, and other features related to travel of a vehicle. The feature group information indicates two or more similar types among a plurality of types of features as the same group.

Figure 1:
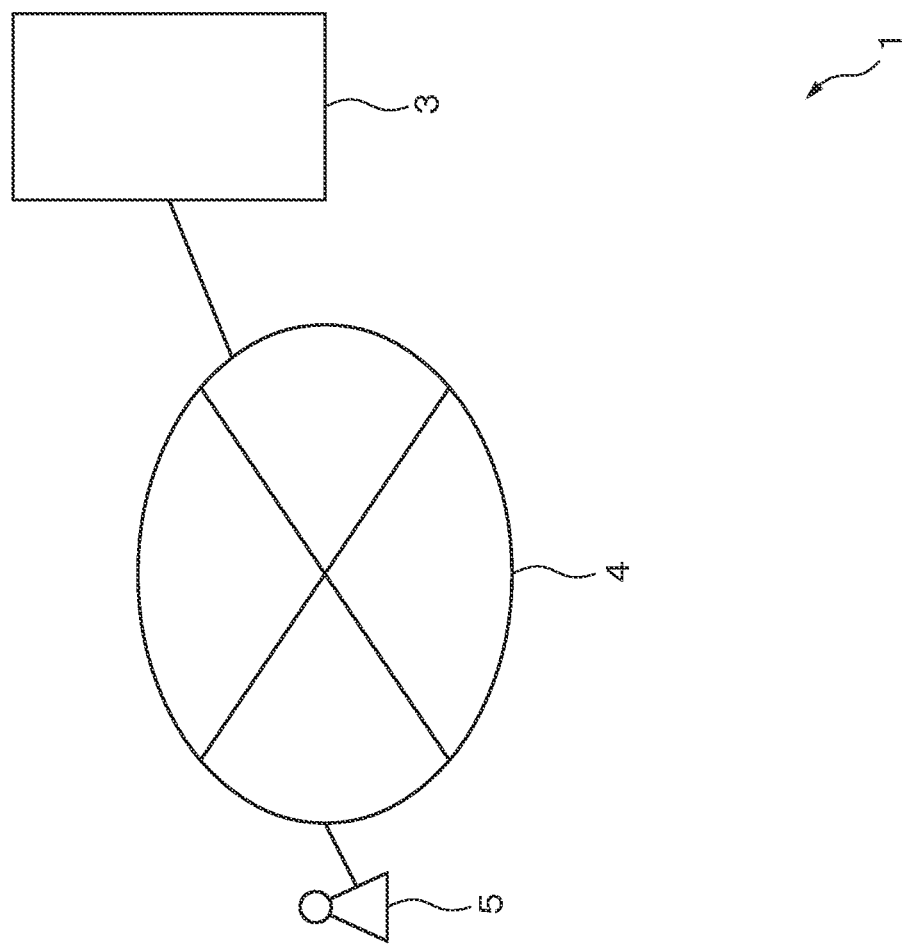
FIG. 1 schematically illustrates the configuration of a feature data collecting system equipped with a map update device.
Figure 1:
Figure 1:
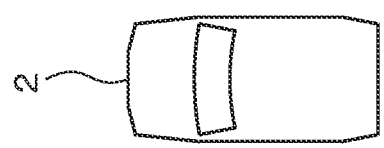

FIG. 1 schematically illustrates the configuration of a feature data collecting system equipped with the map update device. In the present embodiment, the feature data collecting system 1 includes at least one vehicle 2 and a server 3, which is an example of the map update device. Each vehicle 2 accesses a wireless base station 5, which is connected, for example, via a gateway (not illustrated) to a communication network 4 connected with the server 3, thereby connecting to the server 3 via the wireless base station 5 and the communication network 4. For simplicity, FIG. 1 illustrates only a single vehicle 2, but the feature data collecting system 1 may include multiple vehicles 2. FIG. 1 also illustrates only a single wireless base station 5, but the communication network 4 may be connected with multiple wireless base stations 5. The server 3 may be communicably connected via the communication network to a traffic information server (not illustrated) that manages traffic information.

Figure 2:
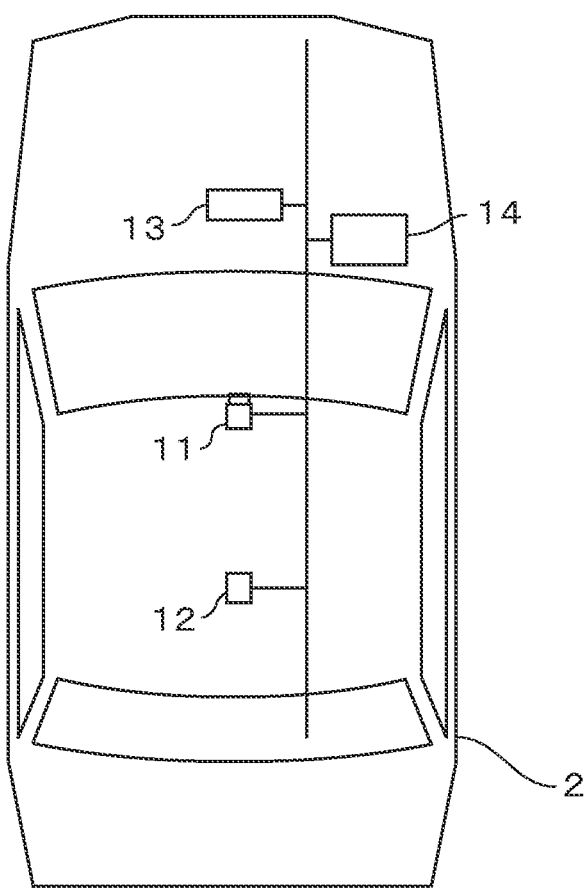
FIG. 2 schematically illustrates the configuration of a vehicle.

FIG. 2 schematically illustrates the configuration of the vehicle 2. The vehicle 2 includes a camera 11, a GPS receiver 12, a wireless communication terminal 13, and a data acquisition device 14, which are communicably connected via an in-vehicle network conforming to a standard such as a controller area network. The vehicle 2 may further include a navigation device (not illustrated) that searches for a planned travel route of the vehicle 2 and that navigates so that the vehicle 2 travels along the planned travel route.

The camera 11, which is an example of an image capturing unit for taking pictures of the surroundings of the vehicle 2, includes a two-dimensional detector constructed from an array of optoelectronic transducers, such as CCD or C-MOS, having sensitivity to visible light and a focusing optical system that forms an image of a target region on the two-dimensional detector. The camera 11 is mounted in the interior of the vehicle 2 so as to be oriented, for example, to the front of the vehicle 2. The camera 11 takes pictures of a region in front of the vehicle 2 every predetermined capturing period (e.g., $1/30$ to $1/10$ seconds), and generates images representing the region. The images obtained by the camera 11 may be color or grayscale images. The vehicle 2 may include multiple cameras 11 taking pictures in different orientations or having different focal lengths.

Every time an image is generated, the camera 11 outputs the generated image to the data acquisition device 14 via the in-vehicle network.

The GPS receiver 12 receives GPS signals from GPS satellites at predetermined intervals, and determines the position of the vehicle 2, based on the received GPS signals. The GPS receiver 12 outputs positioning information indicating the result of determination of the position of the vehicle 2 based on the GPS signals to the data acquisition device 14 via the in-vehicle network at predetermined intervals. Instead of the GPS receiver 12, the vehicle 2 may include a receiver conforming to another satellite positioning system. In this case, the receiver determines the position of the vehicle 2.

The wireless communication terminal 13, which is an example of a communication unit, is a device to execute a wireless communication process conforming to a predetermined standard of wireless communication, and accesses, for example, the wireless base station 5 to connect to the server 3 via the wireless base station 5 and the communication network 4. For example, the wireless communication terminal 13 generates an uplink radio signal including feature data and the like received from the data acquisition device 14, and transmits the uplink radio signal to the wireless base station 5 to transmit the feature data, travel information and the like to the server 3. In addition, the wireless communication terminal 13 receives a downlink radio signal from the wireless base station 5, and passes, for example, a collection instruction or a collection stop instruction from the server 3 included in the radio signal to the data acquisition device 14 or an electronic control unit (ECU, not illustrated) that controls travel of the vehicle 2.

Figure 3:
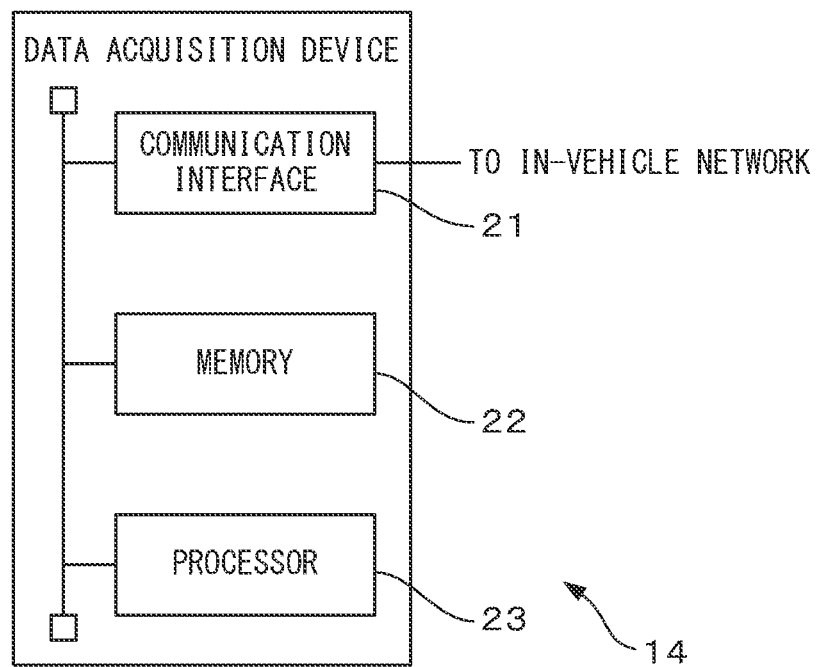
FIG. 3 illustrates the hardware configuration of a data acquisition device.

FIG. 3 illustrates the hardware configuration of the data acquisition device. The data acquisition device 14 generates feature data, based on an image generated by the camera 11, and further generates travel information of the vehicle 2. To achieve this, the data acquisition device 14 includes a communication interface 21, a memory 22, and a processor 23.

The communication interface 21, which is an example of an in-vehicle communication unit, includes an interface circuit for connecting the data acquisition device 14 to the in-vehicle network. In other words, the communication interface 21 is connected to the camera 11, the GPS receiver 12, and the wireless communication terminal 13 via the in-vehicle network. Every time an image is received from the camera 11, the communication interface 21 passes the received image to the processor 23. Every time positioning information is received from the GPS receiver 12, the communication interface 21 passes the received positioning information to the processor 23. In addition, the communication interface 21 passes a collection instruction and a collection stop instruction of feature data to the processor 23; these instructions are received from the server 3 via the wireless communication terminal 13. In addition, the communication interface 21 outputs feature data received from the processor 23 to the wireless communication terminal 13 via the in-vehicle network.

The memory 22 includes, for example, volatile and nonvolatile semiconductor memories. The memory 22 may further include other storage, such as a hard disk drive. The memory 22 stores various types of data used in a process related to generation of feature data, which is executed by the processor 23 of the data acquisition device 14. Such data includes, for example, identifying information of the vehicle 2; parameters of the camera 11, such as the height of the mounted position, the orientation, and the angle of view of the camera 11; and a set of parameters for specifying a classifier for detecting a feature from an image. The memory 22 may also store images received from the camera 11 and positioning information received from the GPS receiver 12 for a certain period. In addition, the memory 22 stores information indicating a target region for generating and collecting feature data (hereafter a "collection target region") specified in a collection instruction of feature data. The memory 22 may further store a computer program for implementing various processes executed by the processor 23.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 stores images received from the camera 11 and positioning information received from the GPS receiver 12 in the memory 22. In addition, the processor 23 executes the process related to generation of feature data at predetermined intervals (e.g., 0.1 to 10 seconds) during travel of the vehicle 2.

As the process related to generation of feature data, for example, the processor 23 determines whether the position of the vehicle 2 indicated by positioning information received from the GPS receiver 12 is within a collection target region. When the position of the vehicle is within a collection target region, the processor 23 generates feature data, based on an image received from the camera 11.

For example, the processor 23 inputs an image received from the camera 11 into a classifier that has been trained to detect a detection target feature, thereby detecting a feature represented in the inputted image (hereafter simply the "input image"). The processor 23 generates information indicating the type of the detected feature as feature data. As such a classifier, the processor 23 may use, for example, a deep neural network (DNN) that has been trained to detect a feature represented in an input image from the input image. As such a DNN, for example, a DNN having architecture of a convolutional neural network (CNN) type, such as Single Shot MultiBox Detector (SSD) or Faster R-CNN, is used. Alternatively, as such a classifier, the processor 23 may use a DNN having architecture of a self-attention network type. In this case, for each type of detection target feature (e.g., a lane-dividing line, a pedestrian crossing, and a stop line), the classifier calculates a confidence score indicating how likely the feature is represented in a region in the input image; the classifier calculates the confidence score for each of various regions in the input image. The classifier determines that a region where the confidence score of a certain type of feature is not less than a predetermined detection threshold represents the type of feature. The classifier then outputs information indicating a region including a detection target feature in the input image, e.g., a circumscribed rectangle of the detection target feature (hereafter an "object region") and information indicating the type of the feature represented in the object region. Thus, the processor 23 generates feature data so as to include the information indicating the type of the feature represented in the detected object region.

Even if there is not a feature of a type having a confidence score not less than the detection threshold in an object region, the processor 23 may determine that the object region represents a feature, when the sum of the confidence scores of a predetermined number of types of features in descending order of the confidence score is not less than the detection threshold. Regarding the object region, the processor 23 may generate feature data so as to include information indicating a predetermined number of types in descending order of the confidence score and indicating the corresponding confidence scores. For example, assume that the detection threshold is 0.8, the confidence scores of a no-parking sign, a no-parking/stopping sign, and a no-thoroughfare sign are calculated as 0.6, 0.3, and 0.1, respectively, regarding a feature represented in an object region, and the predetermined number is 2. In this case, the sum (0.9) of the confidence scores of no-parking and no-parking/stopping signs is greater than the detection threshold. Thus, the processor 23 includes information indicating no-parking and no-parking/stopping signs, as information indicating the type of the feature represented in the object region, in feature data. The processor 23 further includes the confidence scores 0.6 and 0.3 calculated for no-parking and no-parking/stopping signs, respectively, in the feature data.

In addition, the processor 23 identifies the real-space position of the feature indicated by the feature data, and includes information indicating the position in the feature data. The position of each of pixels in an image corresponds one-to-one to the direction from the camera 11 to objects represented in the pixel. Thus, the processor 23 estimates the position of the feature, based on the direction from the camera 11 corresponding to the centroid of the object region representing the feature, the position and the travel direction of the vehicle 2 at the time of generation of the image from which the feature is detected, and parameters of the camera 11 (e.g., the orientation, the angle of view, and the height of the mounted position). To this end, the processor 23 can use the position indicated by positioning information received from the GPS receiver 12 at the timing closest to the time of generation of the image used for generating the feature data as the position of the vehicle 2. Alternatively, in the case that the ECU (not illustrated) estimates the position of the vehicle 2, the processor 23 may obtain information indicating the estimated position of the vehicle 2 from the ECU via the communication interface 21. The processor 23 further obtains information indicating the travel direction of the vehicle 2 from the ECU (not illustrated). Alternatively, the processor 23 may estimate the position of the feature indicated by the feature data, by "structure from motion (SfM)." In this case, the processor 23 associates object regions representing the same feature in two images obtained at different timings with each other, using optical flow. The processor 23 can estimate the position of the feature by triangulation, based on the positions and the travel directions of the vehicle 2 at the times of acquisition of the two images, the parameters of the camera 11, and the positions of the object regions in the respective images.

The processor 23 includes the latitude and longitude indicating the position of the feature indicated by the feature data in the feature data, as information indicating the position of the feature indicated by the feature data.

The processor 23 may further include the identifying information of the vehicle 2 in the feature data. The processor 23 may also include, in the feature data, information used for estimating the position of the feature, e.g., the parameters of the camera 11 and the position of the feature in the image. In addition, the processor 23 may include, in the feature data, the position and the travel direction of the vehicle 2 at the time of generation of the feature data, which are used for estimating the position of the feature, as well as the intensity of received GPS signals used for determining the position of the vehicle 2. Every time feature data is generated, the processor 23 outputs the generated feature data to the wireless communication terminal 13 via the communication interface 21. In this way, feature data is transmitted to the server 3. The processor 23 may transmit the information used for estimating the position of the feature to the server 3 via the wireless communication terminal 13, together with the identifying information of the vehicle 2 and separately from the feature data.

According to a modified example, the processor 23 may use an image itself generated by the camera 11 (hereafter a "whole image") or a sub-image obtained by cutting out a region representing a road surface from a whole image as feature data. In this case also, the processor 23 may include the position and the travel direction of the vehicle 2 at the time of generation of the feature data and the parameters of the camera 11 in the feature data so that the server 3 can detect a feature and its position from the whole image or the sub-image.

In the case where a collection stop instruction is received from the server 3 regarding a collection target region, the processor 23 does not generate feature data of features in the collection target region.

Figure 4:
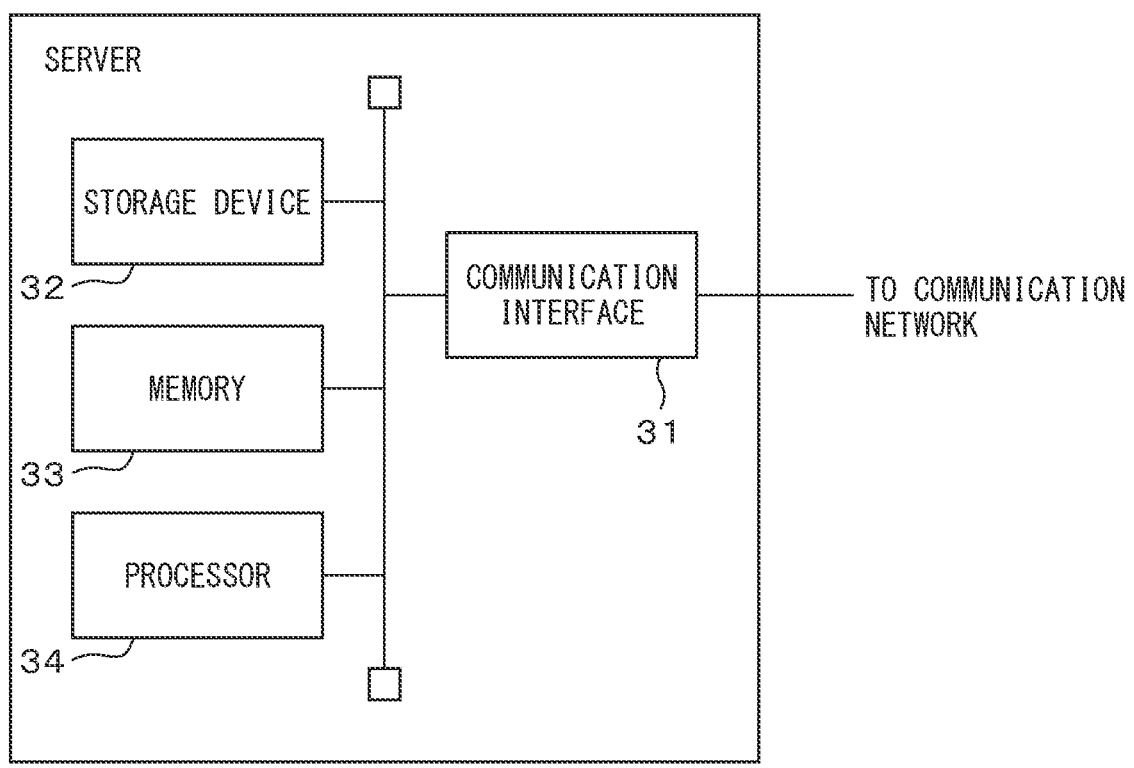
FIG. 4 illustrates the hardware configuration of a server, which is an example of the map update device.

The following describes the server 3, which is an example of the map update device. FIG. 4 illustrates the hardware configuration of the server 3, which is an example of the map update device. The server 3 includes a communication interface 31, a storage device 32, a memory 33, and a processor 34. The communication interface 31, the storage device 32, and the memory 33 are connected to the processor 34 via a signal line. The server 3 may further include an input device, such as a keyboard and a mouse, and a display device, such as a liquid crystal display.

The communication interface 31, which is an example of the communication unit, includes an interface circuit for connecting the server 3 to the communication network 4. The communication interface 31 is configured to be communicable with the vehicle 2 via the communication network 4 and the wireless base station 5. More specifically, the communication interface 31 passes, to the processor 34, feature data received from the vehicle 2 via the wireless base station 5 and the communication network 4. In addition, the communication interface 31 transmits a collection instruction and a collection stop instruction received from the processor 34 to the vehicle 2 via the communication network 4 and the wireless base station 5.

The storage device 32, which is an example of the storage unit, includes, for example, a hard disk drive, or an optical medium and an access device therefor, and stores various types of data and information used in a map update process. For example, the storage device 32 stores map information to be generated or updated, the positions and types of individual registered features represented in the map information, and the identifying information of each vehicle 2. In addition, the storage device 32 stores feature group information and feature data received from each vehicle 2. The storage device 32 may further store a computer program executed by the processor 34 for executing the map update process.

The memory 33, which is another example of the storage unit, includes, for example, nonvolatile and volatile semiconductor memories. The memory 33 temporarily stores various types of data generated during execution of the map update process.

The processor 34, which is an example of a control unit, includes one or more central processing units (CPUs) and a peripheral circuit thereof. The processor 34 may further include another operating circuit, such as a logic-arithmetic unit or an arithmetic unit. The processor 34 executes the map update process.

Figure 5:
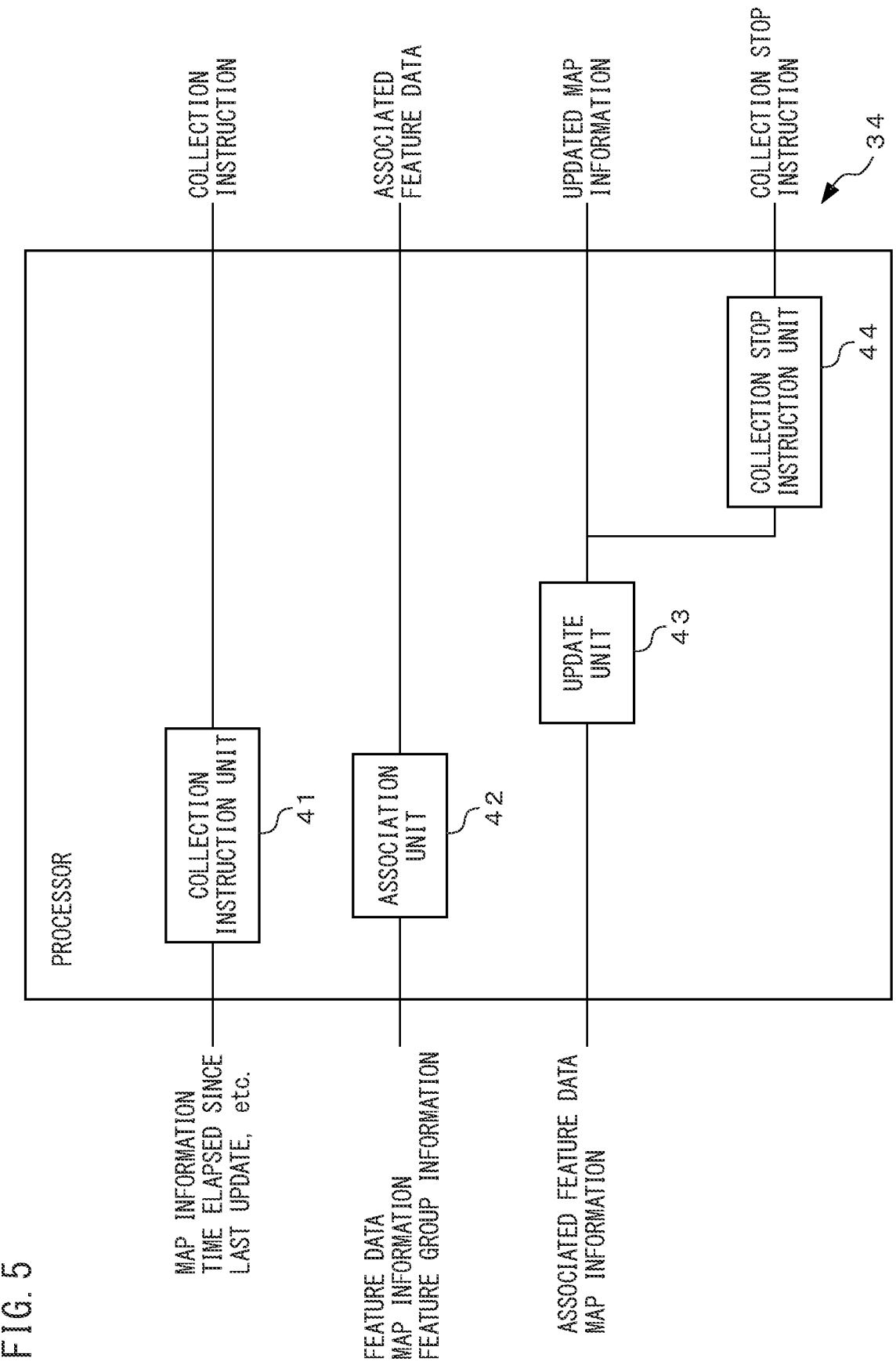
FIG. 5 is a functional block diagram of a processor of the server, related to a map update process.

FIG. 5 is a functional block diagram of the processor 34, related to the map update process. The processor 34 includes a collection instruction unit 41, an association unit 42, an update unit 43, and a collection stop unit 44. These units included in the processor 34 are functional modules, for example, implemented by a computer program executed by the processor 34, or may be dedicated operating circuits provided in the processor 34.

The collection instruction unit 41 generates a collection instruction to instruct the vehicle 2 to collect feature data of a feature in any one of collection target regions. Each collection target region may be, for example, one of regions set by dividing the whole region represented in the map to be generated or updated into a grid pattern of a predetermined length (e.g., several dozen to several hundred meters). However, each collection target region is not limited to this example, and may be set so that its area decreases as the density of roads in the region increases. Alternatively, each collection target region may be set so that its area decreases as the density of a particular structure of roads (e.g., intersections or junctions) in the region increases. Alternatively, each collection target region may be set so as to include a single road section or intersection. For example, when map information is newly generated, the collection instruction unit 41 sets each of regions represented in the map information as a collection target region. Alternatively, of the regions represented in the map information to be updated, the collection instruction unit 41 may set a region where a predetermined period has elapsed since the last update as a collection target region. Alternatively, the collection instruction unit 41 may set a collection target region according to information specifying the collection target region and inputted via the input device. Further, when construction information indicating the location of construction is received from the traffic information server, the collection instruction unit 41 may set a region including the location of construction as a collection target region.

The collection instruction unit 41 generates a collection instruction including information for identifying the collection target region, and transmits the generated collection instruction to the vehicle 2 via the communication interface 31.

Every time feature data is received from the vehicle 2 via the wireless base station 5, the communication network 4, and the communication interface 31, the association unit 42 stores the received feature data in the memory 33 or the storage device 32. Further, the association unit 42 associates the feature indicated by the received feature data with one of the individual registered features represented in the map information.

To achieve this, the association unit 42 identifies a registered feature within a predetermined distance (e.g., several meters to a dozen or so meters) of the position of the feature indicated by the received feature data among the individual registered features represented in the map information. Among the identified registered features, the association unit 42 makes an association with a registered feature of the same type or a type belonging to the same group as the feature indicated by the received feature data. To this end, the association unit 42 identifies a registered feature belonging to the same group as, i.e., of a type similar to, the type of the feature indicated by the feature data, by referring to the feature group information.

Figure 6:
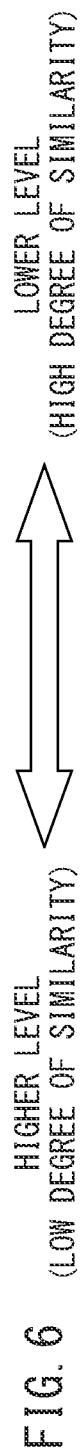
FIG. 6 illustrates an example of feature group information.

FIG. 6 illustrates an example of the feature group information. As illustrated in a table 600, which is an example of the feature group information, the types of features are grouped in a three-layer hierarchy. Types belonging to a lower-layer group have a higher degree of similarity. For example, regarding lane-dividing lines of road markings, both a white solid line and a yellow solid line, which are examples of features, are included in group "solid lines." Both a white broken line and a yellow broken line, which are other examples of features, are included in group "broken lines." In addition, both group "solid lines," which includes a white solid line and a yellow solid line, and group "broken lines," which includes a white broken line and a yellow broken line, are included in group "demarcation lines." In addition, both a curbstone or wall border and a structure border, which are other examples of features, are included in group "road borders." Both groups "demarcation lines" and "road borders" are included in group "continuous features." The types of features may be grouped in a hierarchy having two layers or four or more layers.

Figure 7A:
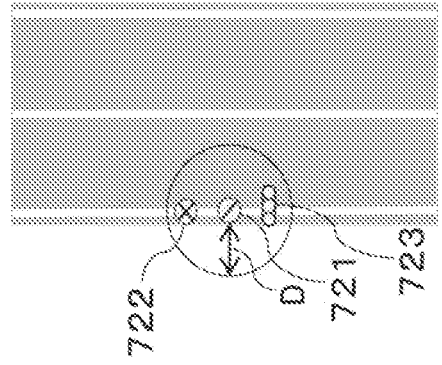
FIG. 7A illustrates an example of association of a feature indicated by collected feature data with a registered feature.
Figure 7B:
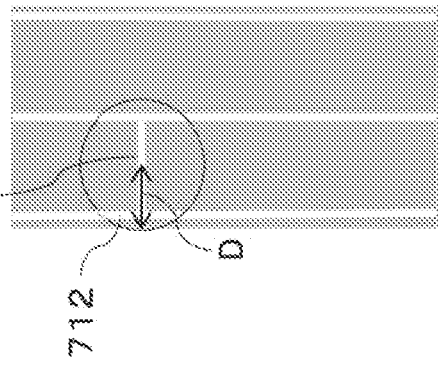
FIG. 7B illustrates an example of association of a feature indicated by collected feature data with a registered feature.
Figure 7C:
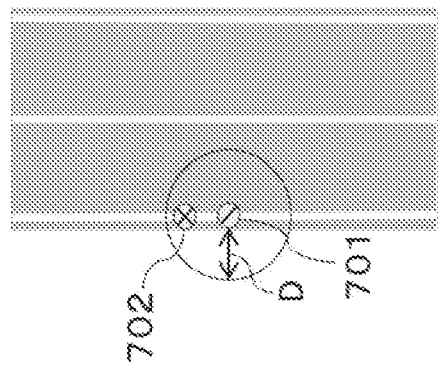
FIG. 7C illustrates an example of association of a feature indicated by collected feature data with a registered feature.

FIGS. 7A to 7C illustrates examples of association of a feature indicated by collected feature data with a registered feature. In the example illustrated in FIG. 7A, the type of feature 701 indicated by feature data is a no-parking sign, and within a predetermined distance D of the position of the feature 701, map information represents a no-parking/stopping sign as a registered feature 702. As illustrated in the Table 600 of FIG. 6, a no-parking sign and a no-parking/stopping sign belong to the same group "traffic signs." Thus, the association unit 42 associates the no-parking sign, which is the feature 701 indicated by the feature data, with the no-parking/stopping sign, which is the registered feature 702.

In the example illustrated in FIG. 7B, the type of feature 711 indicated by feature data is a stop line, and within a predetermined distance D of the position of the feature 711, map information represents a white solid line as a registered feature 712. However, the map information does not represent a registered feature within a predetermined distance D of the position of the feature 711, except the registered feature 712. Further, a stop line and a white solid line belong to different groups in the table 600. Thus, the association unit 42 determines that no registered feature corresponds to the feature 711 indicated by the feature data, and does not associate the feature 711 with any registered feature.

There may be multiple registered features belonging to the same group as the type of feature indicated by feature data within a predetermined distance of the position of the feature. In such a case, the association unit 42 associates the feature indicated by the feature data with a registered feature closest to the position of the feature indicated by the feature data of the registered features. Alternatively, by referring to the feature group information, the association unit 42 may search for a registered feature of a type belonging to the same group as the type of the feature indicated by the feature data among the registered features in descending order of the degree of similarity, i.e., in order from a lower-layer group, and makes an association with the registered feature. When a registered feature of the same type as the feature indicated by the feature data is included in the registered features, the association unit 42 may preferentially associate the feature indicated by the feature data with the registered feature of the same type. Such an association enables the association unit 42 to increase the possibility that a feature indicated by feature data is appropriately associated with a corresponding registered feature represented in map information.

In the example illustrated in FIG. 7C, the type of feature 721 indicated by feature data is a no-parking sign, and within a predetermined distance D of the position of the feature 721, map information represents registered features 722 and 723, which are a no-parking/stopping sign and a model 1 traffic light, respectively. In the table 600, no-parking and no-parking/stopping signs both belong to group "traffic signs" in the lowest layer. However, a no-parking sign and a model 1 traffic light belong to group "three-dimensional features" in the second lowest layer. Thus, the association unit 42 associates the no-parking sign, which is the feature 721 indicated by the feature data, with the registered feature 722, a no-parking/stopping sign, rather than with the registered feature 723, a model 1 traffic light.

Alternatively, when there are multiple registered features belonging to the same group as the type of feature indicated by feature data within a predetermined distance of the position of the feature, the association unit 42 may associate the feature indicated by the feature data with each of the registered features. In this case, for each registered feature associated with the feature indicated by the feature data, the association unit 42 may set a confidence level indicating reliability of association. For example, the association unit 42 may set a higher confidence level to a registered feature belonging to the same group as the feature indicated by the feature data in a lower layer. For example, in FIG. 7C, the association unit 42 sets the confidence level of association of the registered feature 722, which is a no-parking/stopping sign and belongs to the same group as the feature 721, which is a no-parking sign, in a lower layer, to 0.7. The association unit 42 may set the confidence level of association of the registered feature 723, which is a model 1 traffic light and belongs to the same group as the feature 721 which is a no-parking sign, in a higher layer, to 0.3.

In addition, the association unit 42 preferably makes a confidence level for the case where a feature indicated by feature data is associated with a registered feature of the same type as the feature higher than a confidence level for the case where the feature is associated with a registered feature of a different type belonging to the same group as the type of the feature.

As described above, feature data may include information indicating two or more types of features and confidence scores of the respective types. In such a case, the association unit 42 may search, in order from a type having a higher confidence score, for a registered feature of a type belonging to the same group as the type, and associate the registered feature with the feature indicated by the feature data. In other words, the association unit 42 executes the association process in order from a type having a higher confidence score. When a certain type of feature is associated with a registered feature, the association unit 42 terminates the association process regarding the feature data, and determines the confidence score of the type of the feature associated with the registered feature as the confidence level of association of the registered feature. To this end, the association unit 42 may associate a feature of a type of interest with a registered feature only when the confidence score of the type is not less than a predetermined threshold. For example, assume that a single piece of feature data includes information indicating two types of features, i.e., no-parking and no-parking/stopping signs, and the confidence scores 0.6 and 0.3 of no-parking and no-parking/stopping signs, respectively. Further, assume that in map information, a registered feature that is a traffic sign is registered within a predetermined distance of the position of the feature indicated by the feature data. In this case, since the no-parking sign having a higher confidence score and the registered feature belong to the same group, the no-parking sign is associated with the registered feature, and the confidence level of association is set to 0.6. Such an association enables the association unit 42 to increase the possibility that a feature indicated by feature data is appropriately associated with a corresponding registered feature represented in map information.

Alternatively, of two or more types of features indicated by feature data, the association unit 42 may determine a type belonging to the same group in the lowest layer as the type of registered feature within a predetermined distance of the position of the feature, as the type of feature associated with the registered feature. In this case also, the association unit 42 may determine the confidence score corresponding to the type of the feature associated with the registered feature as the confidence level of association.

For each piece of received feature data, the association unit 42 stores the result of association of the feature indicated by the feature data, in the memory 33.

For each registered feature represented in the map information and located in a collection target region, the update unit 43 updates at least the position or type of the registered feature, based on the features indicated by at least a predetermined number (e.g., 1) of pieces of feature data associated with the registered feature. In the following, a feature indicated by feature data and associated with a registered feature will be referred to simply as a "feature."

For example, the update unit 43 refers to features associated with a registered feature of interest and stored in the memory 33. The update unit 43 updates the position of the registered feature of interest to an average position determined by averaging the positions of the features associated with the registered feature. When a confidence level of association is set for each feature, the update unit 43 may update the position of the registered feature of interest to an average position obtained by averaging those positions of the features associated with the registered feature each of which is weighted by the confidence level. More specifically, the update unit 43 assigns a greater weighting factor to the position of a feature having a higher confidence level. In this way, the use of the positions of features weighted by the respective confidence levels for updating the position of a corresponding registered feature enables the update unit 43 to update the position of the registered feature more appropriately. When feature data associated with the registered feature of interest includes confidence scores of types of features, the update unit 43 may update the position of the registered feature of interest to an average position obtained by averaging those positions of the features associated with the registered feature which are weighted by the respective confidence scores.

The update unit 43 may update the type of registered feature of interest to the type having the most frequent value of the types of features associated with the registered feature. When a confidence level of association is set for each feature, the update unit 43 may calculate the sum of the confidence levels for each type of feature associated with the registered feature of interest, and determine the maximum of the sums of the confidence levels as the most frequent value. When feature data associated with the registered feature of interest includes confidence scores of types of features, the update unit 43 may calculate the sum of the confidence scores for each type of feature associated with the registered feature of interest, and determine the maximum of the sums of the confidence scores as the most frequent value.

When no feature is associated with a registered feature of interest, the update unit 43 may determine that the registered feature of interest is removed, and delete the registered feature from the map information. Further, the update unit 43 may determine that a feature indicated by feature data and associated with none of the registered features is newly provided, and add the type and position of the feature to the map information. To this end, the update unit 43 may determine that two or more features separated by less than a predetermined distance and belonging to the same group among the features indicated by pieces of feature data and associated with none of the registered features are the same feature. The update unit 43 may add only one of the two or more features determined to be the same feature to the map information. To this end, the update unit 43 determines the average position of the two or more features as the position of the feature to be registered in the map information, and the type having the most frequent value of the types of the two or more features as the type of the feature to be registered in the map information.

When the number of pieces of feature data collected for a collection target region reaches an expected number or when a scheduled collection period is finished, the collection stop unit 44 stops collection of feature data for the collection target region. The collection stop unit 44 then generates a collection stop instruction including information indicating a stop of collection for the collection target region, and transmits the generated collection stop instruction to the vehicle 2 via the communication interface 31. In this way, collection of feature data related to features in the collection target region is stopped.

Figure 8:
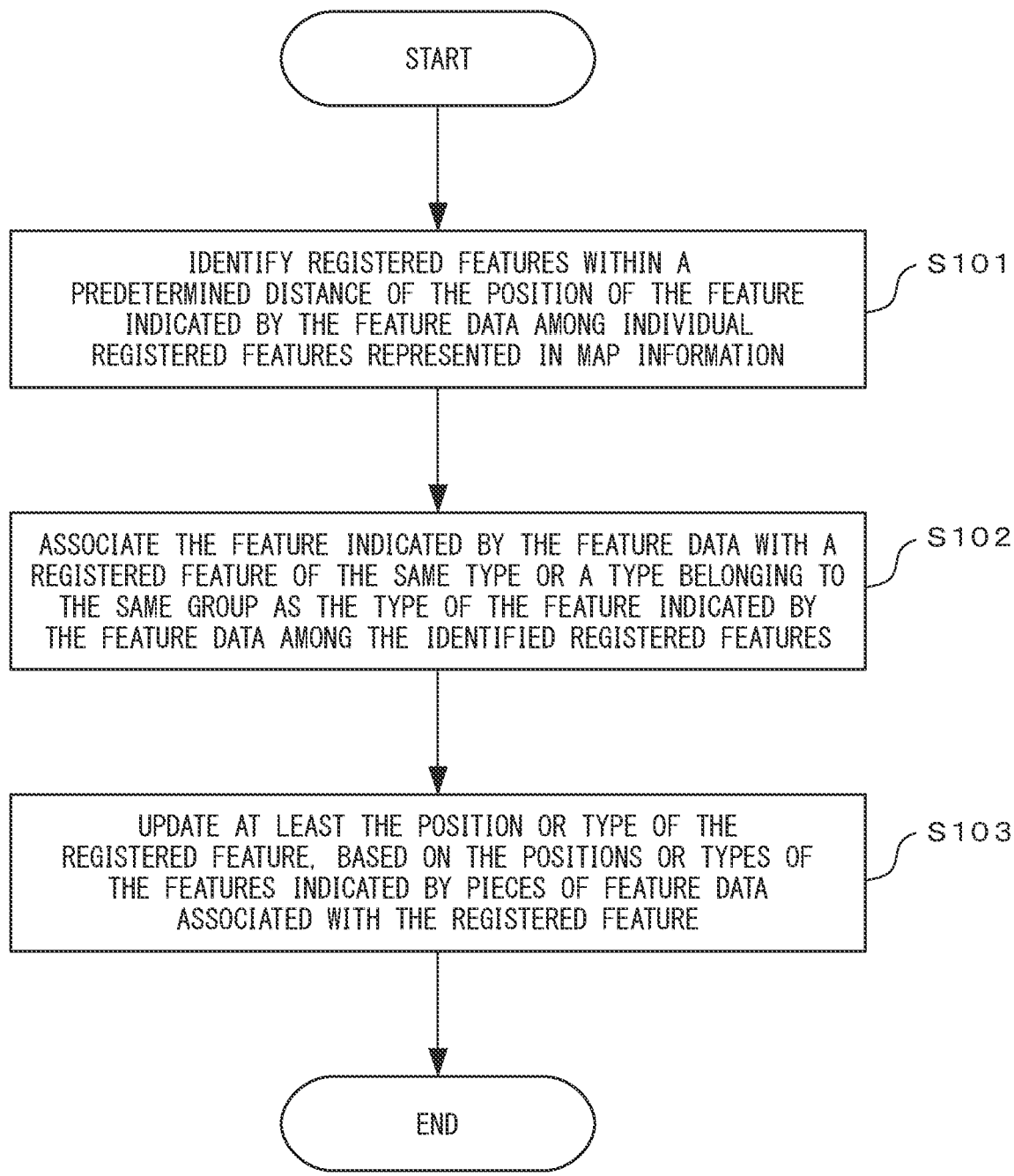
FIG. 8 is an operation flowchart of the map update process.

FIG. 8 is an operation flowchart of the map update process executed by the server 3. The processor 34 of the server 3 executes the map update process in accordance with the operation flowchart described below when the number of pieces of feature data collected for a collection target region reaches an expected number or when a collection period is finished.

For each piece of collected feature data, the association unit 42 of the processor 34 identifies registered features within a predetermined distance of the position of the feature indicated by the feature data among individual registered features represented in map information (step S101). For each piece of feature data, the association unit 42 then associates the feature indicated by the feature data with a registered feature of the same type or a type belonging to the same group as the feature indicated by the feature data among the identified registered features, by referring to the feature group information (step S102). For each registered feature represented in the map information and located in the collection target region, the update unit 43 of the processor 34 updates at least the position or type of the registered feature, based on the positions or types of the features indicated by pieces of feature data associated with the registered feature (step S103). The processor 34 then terminates the map update process. The association unit 42 may execute the processing of steps S101 and S102 every time feature data is received from the vehicle 2.

As has been described above, the map update device enables associating a feature indicated by collected feature data not only with a registered feature of the same type represented in map information but also with a registered feature of a similar type belonging to the same group. Thus, the map update device can correct the position of a registered feature represented in map information using collected feature data, even if the type of feature is erroneously recognized on the side of a vehicle that generates feature data or if the type of the registered feature represented in the map information is incorrect. In addition, the map update device can correct the type of registered feature erroneously represented in map information, based on the type of feature indicated by feature data. In this way, the map update device can update map information appropriately with collected feature data.

According to a modified example, the position of each registered feature represented in map information may be represented by a probability distribution indicating a probability that the registered feature exists as a function of position. The probability distribution may be, for example, a Gaussian distribution. In this case, when the position in the probability distribution at which a registered feature is most likely to exist is within a predetermined distance of the position of a feature indicated by feature data, the association unit 42 assumes that the registered feature is within the predetermined distance of the position of the feature indicated by the feature data. In addition, for each registered feature represented in the map information, the update unit 43 may execute maximum likelihood estimation, based on the positions of the features of pieces of feature data associated with the registered feature, thereby updating the probability distribution of the position of the registered feature. When updating the probability distribution of the position of the registered feature, the update unit 43 may use a confidence level of association or a confidence score determined at detecting a feature as a weighting factor, as in the embodiment.

Further, for each registered feature represented in map information, the update unit 43 may update the probability distribution of the position of the registered feature by Bayesian inference based on the positions of the features of pieces of feature data associated with the registered feature. In this case, the area where a registered feature associated with a feature indicated by received feature data may exist is divided in advance into grid-like divisions. For each division, a probability that the registered feature is located there is set according to the probability distribution before the update. As initial values of the probability, the same probability may be set for each division, or a higher probability may be set for a division where the registered feature is more likely to exist. When a feature indicated by received feature data is associated with a registered feature of interest, the update unit 43 updates the probability of each division set for the registered feature so as to increase the probability of a division including the position of the feature indicated by the received feature data. Alternatively, the update unit 43 may update the probability of each division so that the probabilities of divisions within a predetermined range of the position of the feature indicated by the received feature data increase. To this end, the update unit 43 may increase the probability by a greater amount in a division closer to the position of the feature. Alternatively, for each division, the update unit 43 may set a probability distribution centered at the division and having a variance-covariance matrix of the probability distribution before the update. For each division, the update unit 43 calculates a posteriori probability that the feature exists in the division for the position of the feature indicated by the received feature data, based on the probability distribution of the division, and uses the calculated posteriori probability as the probability of the division after the update (i.e., the priori probability of the division at the next update). The update unit 43 then approximates the probability of each division with a normal distribution to calculate an updated probability distribution of the position of the feature. In this case, since the feature data used for updating the probability distribution may be discarded, the update unit 43 can simplify management of feature data and reduce the amount of memory for storing feature data.

Alternatively, for each registered feature, the update unit 43 may set candidates for the probability distribution of the position of the registered feature. In this case, each candidate may be a normal distribution represented by an average position and a variance-covariance matrix. When a feature indicated by received feature data is associated with a registered feature of interest, the update unit 43 calculates the posteriori probability of each candidate regarding the registered feature for the position of the feature indicated by the received feature data, and uses the posteriori probability as the priori probability of each candidate at the next update. The update unit 43 determines the normal distribution corresponding to the candidate whose priori probability is the highest as the probability distribution of the position of the registered feature. In this case also, the update unit 43 can simplify management of feature data and reduce the amount of memory for storing feature data.

From a single vehicle 2 may be collected pieces of feature data representing features in a somewhat extended road section. In such a case, the positions of the features indicated by the pieces of feature data may deviate from the actual positions of the features in substantially the same direction and by substantially the same distance, depending on, for example, the accuracy of position determination of the vehicle 2. Thus, according to another modified example, the association unit 42 corrects the positions of features indicated by pieces of feature data received from a single vehicle 2 regarding an extended road section. Specifically, the association unit 42 corrects the positions of features of individual pieces of feature data so as to minimize the sum of squares of the differences between the positions of the features of the individual pieces of feature data and those of corresponding registered features represented in map information, and then associates the features with registered features. Specifically, the association unit 42 identifies a corresponding registered feature by referring to the feature group information, as in the embodiment, assuming that a registered feature belonging to the same group as the type of feature included in an individual piece of feature data corresponds to the feature.

When feature data received by the server 3 from the vehicle 2 includes a whole image or a sub-image, the processor 34 of the server 3 may execute the processing of the processor 23 of the data acquisition device 14 in the embodiment and modified examples. More specifically, the processor 34 may detect a feature from the whole image or the sub-image, and estimate the position of the detected feature.

The computer program for causing a computer to achieve the functions of the units included in the processor of the map update device according to the embodiment or modified examples may be provided in a form recorded on a computer-readable storage medium. The computer-readable storage medium may be, for example, a magnetic medium, an optical medium, or a semiconductor memory.

As described above, those skilled in the art may make various modifications according to embodiments within the scope of the present invention.

What is claimed is:

1. A map update device comprising:
  a memory configured to store the positions and types of individual registered features represented in map information as well as feature group information indicating two or more similar types among a plurality of types of features as the same group; and
  a processor configured to:
    identify one or more registered features within a predetermined distance of the position of the feature indicated by feature data received from a vehicle via a communication interface among the individual registered features represented in the map information,
    associate the feature indicated by the feature data with a registered feature of the same type as the feature indicated by the feature data or of a type belonging to the same group as the type of the feature among the one or more identified registered features, by referring to the feature group information, and
    update at least the position or type of at least one of the individual registered features represented in the map information, based on the positions or types of the features indicated by a predetermined number of pieces of the feature data associated with the one of the registered features,
  wherein the feature group information indicates at least a second layer of groups, a first layer of groups, and types of features, the second layer of groups associated with a lower level of similarity than the first layer of groups, and the types of features being associated with specific individual feature descriptions,
  wherein the processor searches for a registered feature of a type belonging to the same group as the type of the feature indicated by the feature data among the one or more identified registered features, and
  wherein the search is performed: (A) in order starting from searching among types of features indicated to be in a same group of the first layer of groups, and (B) by associating a confidence score with the feature indicated by the feature data with reference to the searched registered feature.

2. The map update device according to claim 1, wherein the feature group information indicates groups of two or more levels among which the degree of similarity of the types of the features belonging to the same group differs, and wherein
  the processor increases weights of the features indicated by the predetermined number of pieces of the feature data associated with at least one of the individual registered features represented in the map information as the degree of similarity of a group of the type of the one of the registered features increases, the weights being used for updating the position or type of the one of the registered features.

3. A method for updating a map, comprising:
  identifying one or more registered features within a predetermined distance of the position of a feature indicated by feature data received from a vehicle via a communication interface among individual registered features represented in map information;
  associating the feature indicated by the feature data with a registered feature of the same type as the feature indicated by the feature data or of a type belonging to the same group as the type of the feature among the one or more identified registered features, by referring to feature group information indicating two or more similar types among a plurality of types of the features as the same group; and
  updating at least the position or type of at least one of the individual registered features represented in the map information, based on the positions or types of the features indicated by a predetermined number of pieces of the feature data associated with the one of the registered features,
  wherein the feature group information indicates at least a second layer of groups, a first layer of groups, and types of features, the second layer of groups associated with a lower level of similarity than the first layer of groups, and the types of features being associated with specific individual feature descriptions,
  wherein the associating comprises searching for a registered feature of a type belonging to the same group as the type of the feature indicated by the feature data among the one or more identified registered features, and
  wherein the searching is performed: (A) in order starting from searching among types of features indicated to be in a same group of the first layer of groups, and (B) by associating a confidence score with the feature indicated by the feature data with reference to the searched registered feature.

4. A non-transitory recording medium that stores a computer program for updating a map, the computer program causing a computer to execute a process comprising:
  identifying one or more registered features within a predetermined distance of the position of a feature indicated by feature data received from a vehicle via a communication interface among individual registered features represented in map information;
  associating the feature indicated by the feature data with a registered feature of the same type as the feature indicated by the feature data or of a type belonging to the same group as the type of the feature among the one or more identified registered features, by referring to feature group information indicating two or more similar types among a plurality of types of the features as the same group; and updating at least the position or type of at least one of the individual registered features represented in the map information, based on the positions or types of the features indicated by a predetermined number of pieces of the feature data associated with the one of the registered features, wherein the feature group information indicates at least a second layer of groups, a first layer of groups, and types of features, the second layer of groups associated with a lower level of similarity than the first layer of groups, and the types of features being associated with specific individual feature descriptions, wherein the associating comprises searching for a registered feature of a type belonging to the same group as the type of the feature indicated by the feature data among the one or more identified registered features, and wherein the searching is performed: (A) in order starting from searching among types of features indicated to be in a same group of the first layer of groups, and (B) by associating a confidence score with the feature indicated by the feature data with reference to the searched registered feature.

5. The map update device of claim 1, wherein the processor is further configured to only identify a first feature within a predetermined distance if a first confidence value is above a predetermined threshold.

6. The map update device of claim 1, wherein the processor is further configured to update the at least the position of the at least one of the individual features based on a weighted average of two or more of the pieces of the feature data, wherein weights in the weighted average correspond to the respective confidence values of the two or more pieces of feature data.

7. The map update device of claim 6, wherein the processor is further configured to only update the at least the position of the at least one of the individual features if a summation of confidence values associated with a predetermined number of the pieces of the feature data is greater than a detection threshold.

\* \* \* \* \*